(12) United States Patent
Hosoi et al.

(10) Patent No.: US 7,970,140 B2
(45) Date of Patent: Jun. 28, 2011

(54) METHOD AND SYSTEM FOR ENCRYPTED COMMUNICATIONS USING MULTI-VALUED MODULATION

(75) Inventors: Takeshi Hosoi, Yokohama (JP); Katsuyoshi Harasawa, Ninomiya (JP); Makoto Honda, Odawara (JP); Shigeto Akutsu, Yokohama (JP)

(73) Assignee: Hitachi Information & Communication Engineering, Ltd., Kanagawa (JP)

( * ) Notice: Subject to any disclaimer, the term of this patent is extended or adjusted under 35 U.S.C. 154(b) by 1066 days.

(21) Appl. No.: 11/740,389

(22) Filed: Apr. 26, 2007

(65) Prior Publication Data

US 2007/0255679 A1 Nov. 1, 2007

(30) Foreign Application Priority Data

Apr. 27, 2006 (JP) ................................. 2006-123334

(51) Int. Cl.
*H04K 1/00* (2006.01)
(52) U.S. Cl. .......... 380/273; 380/274; 380/43; 713/171; 713/375
(58) Field of Classification Search .................... None
See application file for complete search history.

(56) References Cited

U.S. PATENT DOCUMENTS

| | | | | |
|---|---|---|---|---|
| 2003/0181214 A1* | 9/2003 | Grob et al. | ..................... | 455/515 |
| 2004/0247127 A1* | 12/2004 | Rose | ............................. | 380/274 |
| 2005/0227615 A1* | 10/2005 | Sakoda | ............................. | 455/7 |
| 2006/0072753 A1* | 4/2006 | Nishimura | ..................... | 380/262 |
| 2007/0234051 A1* | 10/2007 | Akutsu et al. | ................. | 713/168 |
| 2008/0130887 A1* | 6/2008 | Harvey et al. | ................. | 380/256 |

OTHER PUBLICATIONS

Schneier "Applied Cryptography", 1996, Wiley and Sons, pp. 197-202.*
"Secure communication using mesoscopic coherent states" by G. Barbosa, et al, 2003.
"Quantum Cryptography: Public Key Distribution and Coin Tossing" by C. Bennett., International Conference on Computers, System & Signal Processing, Bangalore, India Dec. 1984.
"Quantum Stream Cipher Based on Optical Communications" by Osamu Hirota, et al, Jul. 2004.

* cited by examiner

*Primary Examiner* — Michael J Simitoski
*Assistant Examiner* — Brian Olion
(74) *Attorney, Agent, or Firm* — Brundidge & Stanger, P.C.

(57) ABSTRACT

A transmitting node produces synchronization data to be inserted into plain text and encrypts the thus generated data into multi-valued data so as to transmit the data. The synchronization data indicates the position of a running key used for encryption. A receiving node decrypts a signal including the synchronization data using the running key and detects the synchronization data from the signal to confirm synchronization of the running key between transmitting and receiving nodes. Then, the receiving node transmits a synchronization confirmation signal to the transmitting node. If the transmitting node does not receive the synchronization confirmation signal, it determines that synchronization of the running key is shifted, and re-synchronization is performed. To perform re-synchronization, a running key ahead of the position of the running key associated with synchronization data that has been stored is generated.

16 Claims, 5 Drawing Sheets

_US 7,970,140 B2_

METHOD AND SYSTEM FOR ENCRYPTED COMMUNICATIONS USING MULTI-VALUED MODULATION

BACKGROUND OF THE INVENTION

1. Field of the Invention

The present invention relates to a method and a system for encrypted communications using a multi-valued modulation scheme. The invention more particularly relates to a method for synchronization of a running key between a transmitting node and a receiving node in an encryption communication system using a multi-valued modulation scheme representing Yuen quantum cryptography, and to detection of a shift of the synchronization of the running key and re-synchronization of the running key between the transmitting and receiving nodes.

2. Description of the Related Art

Yuen quantum cryptography is also referred to as quantum cryptography for optical communications. In Yuen quantum cryptography, quantum fluctuations (quantum shot noise) of light are spread by modulation so that an eavesdropper cannot properly receive an optical signal and that data cannot be deciphered even by infinite computational power. Thus, in recent years, it has been proposed that Yuen quantum cryptography be applied to a shared key encryption scheme. The shared key encryption scheme is designed so that a binary optical signal carrying data to be transmitted in a binary code is regarded as one set (which is called a basis), and that an M number of the bases are prepared, and that a basis used to transmit data among the bases is randomly determined based on the pseudo-random number that is in accordance with an encryption key. Practically, a multi-valued optical signal is designed such that an inter-signal distance is small enough to prevent data identification due to quantum fluctuations. Thus, the eavesdropper cannot decipher data information from a received signal.

Optical modulation/demodulation devices used in the legitimate transmitting node and the legitimate receiving node operate to communicate data while changing the M number of the binary bases in accordance with common pseudo-random numbers. Thus, the legitimate receiving node can read data by detecting a binary signal having a large inter-signal distance. As a result, an error due to quantum fluctuations can be ignored, whereas it is makes it possible to provide appropriate communications.

The encryption based on the abovementioned optical modulation scheme is called Yuen quantum cryptography based on Yuen-2000 cryptographic communication protocol (abbreviated to Y-00 Protocol). Northwestern University where P. Kumar, H. Yuen, et al. are enrolled has disclosed an optical phase modulation technique, which is a communication scheme that allows for the Y-00 Protocol, in Non-Patent Document 1 (G. A. Barbosa, E. Corndorf, P. Kumar, H. P. Yuen, "Secure communication using mesoscopic coherent state," Phys. Rev. Lett. Vol-90, 227901, (2003)). In addition, a group of Tamagawa University has disclosed an optical intensity modulation technique in Non-Patent Document 2 (O. Hirota, K. Kato, M. Sohma, T. Usuda, K. Harasawa, "Quantum stream cipher based on optical communication" SPIE Proc. on Quantum Communications and Quantum Imaging vol-5551, (2004)).

In a quantum encryption scheme in optical communications using a multi-valued modulation scheme representing Yuen quantum cryptography which is an optical intensity modulation scheme, a basis of a signal to be transmitted is determined in accordance with a running key that is generated from an encryption key. In order to receive the signal, it is necessary that a threshold value that is used to discriminate the signal should be changed so as to obtain an optimal level of the discrimination in accordance with a running key. In this case, when the synchronization of the running key that is used for encryption and decryption and that is shared between a transmitting node and a receiving node is shifted, the receiving node cannot properly decrypt the received signal.

The shift of the synchronization of the running key may be caused by: a failure or the like in a transmission system such as a fluctuation of the intensity of light for transmission and a fluctuation of the wavelength of light for transmission due to a change in temperature in a transmission device; a failure or the like in a receiving system such as a timing detection error; a failure or the like in a network such as disconnection of an optical fiber and a failure in a router; an inoperative status such as power breakdown in either of the transmitting node or the receiving node; and the like.

In order to reinitiate encrypted communications in the state in which the synchronization of the running key is shifted due to at least one of the abovementioned failures or the like, it is necessary that the transmitting node and the receiving node share the position of the running key and communications be initiated in the state in which the position of the running key in the transmitting node is the same as that in the receiving node. In encrypted communications using a multi-valued modulation scheme based on Yuen quantum cryptography, if a third party does not have the encryption key or uses an incorrect key, he cannot obtain proper information. Thus, even when a key is shifted as much as conventional mathematical encryptions, encrypted data cannot be deciphered by temporarily storing received data and sequentially applying the key. Therefore, it is necessary that the synchronization of the running key be established without reduction in encryption strength during encrypted communications, and that the position of the running key, which is used when re-synchronization is performed, be properly shared when a shift of the synchronization occurs.

SUMMARY OF THE INVENTION

An object of the present invention is to provide a method and a system for encrypted communications using a multi-valued modulation scheme that allows for detection of a shift of synchronization of a running key between a transmitting node and a receiving node and for re-synchronization of the running key, and to provide transmitting and receiving devices used in the system.

A method for encrypted communications using a multi-valued modulation scheme according to one aspect of the present invention is such that a transmitting node modulates data to be transmitted into multi-valued data using a running key so as to encrypt the data and transmits the encrypted data, and that a receiving node receives the transmitted data and decrypts it using the same running key as the running key used for the encryption. Specifically, in the method for encrypted communications using a multi-valued modulation scheme, the following operations are performed. That is, the transmitting node produces synchronization data to be inserted in transmission data and then transmits the transmission data including the synchronization data. The synchronization data is used to confirm synchronization of the running key between the transmitting and receiving nodes. When the receiving node legitimately receives the synchronization data, it confirms the synchronization of the running key. In addition, storage means provided in the transmitting node and storage means provided in the receiving node each store the synchronization data that has been transmitted and received, and each store information on the position of the running key that has been used to encrypt and decrypt the synchronization data. Furthermore, if re-synchronization of the running key between the transmitting and receiving nodes is required, a running key used for encryption and decryption is generated based on the information on the position of the running key related to the synchronization data that has been stored in the storage means.

In a method for encrypted communications using a multi-valued modulation scheme according to another aspect of the present invention, the transmitting node modulates transmission data into multi-valued data using a running key so as to encrypt the multi-valued data and transmits the encrypted data, and the receiving node receives the transmitted data and decrypts it using the same running key as the running key used for the encryption. Specifically, in the method for encrypted communications using a multi-valued modulation scheme, the following operations are performed. That is, the transmitting node produces synchronization data to be inserted in transmission data and then transmits the transmission data including the synchronization data. The synchronization data is used to confirm synchronization of the running key between the transmitting and receiving nodes. When the receiving node legitimately receives the synchronization data, the receiving node transmits to the transmitting node a synchronization confirmation signal used to confirm the synchronization of the running key between the transmitting and receiving nodes. If the transmitting node does not receive the synchronization confirmation signal under a predetermined condition(s), the transmitting node transmits to the receiving node a status confirmation signal used to confirm the status of the receiving node. If the transmitting node does not legitimately receive a response to the status confirmation signal, it determines that the synchronization is shifted, and the re-synchronization of the running key is performed.

Furthermore, in a method for encrypted communications using a multi-valued modulation scheme according to the further aspect of the present invention, the transmitting node modulates data to be transmitted into multi-valued data using a running key so as to encrypt the multi-valued data and transmits the encrypted data, and the receiving node receives the transmitted data and decrypts it using the same running key. Specifically, in the method for encrypted communications using a multi-valued modulation scheme, the following operations are performed. That is, the transmitting node produces synchronization data to be inserted in transmission data and then transmits the transmission data including the synchronization data. The synchronization data is used to confirm synchronization of the running key between the transmitting and receiving nodes. When the receiving node legitimately receives the synchronization data, the receiving node transmits a synchronization confirmation signal to the transmitting node. When the transmitting node legitimately receives the synchronization confirmation signal, the transmitting node continues to modulate transmission data into multi-valued data using the running key. If the receiving node cannot receive the synchronization data under a predetermined condition(s), the receiving node transmits to the transmitting node a status confirmation signal to confirm the status of the transmitting node. If the receiving node does not legitimately receive a response to the status confirmation signal from the transmitting node, the receiving node transmits to the transmitting node a request (re-synchronization request) for performing re-synchronization of the running key between the transmitting and receiving nodes. After the transmitting node receives the re-synchronization request, the re-synchronization of the running key is performed.

Furthermore, in still another preferable embodiment of the method for encrypted communications using a multi-valued modulation scheme, if the transmitting node receives only a q number of the synchronization confirmation signals in response to a p ($=2$ or more ($p \geqq q$)) number of signals including the synchronization data, the transmitting node transmits a status confirmation signal to the receiving node.

Preferably, if the receiving node cannot detect the synchronization data that has been transmitted from the transmitting node within a predetermined time or within a predetermined number of bits, the receiving node transmits a status confirmation signal to the transmitting node.

Preferably, the transmitting node encrypts transmission data including plain text and synchronization data into multi-valued data using the running key and transmits the encrypted data.

Preferably, one unit of the synchronization data is inserted in one or more plain text blocks. In addition, the position of the synchronization data that is inserted in the plain text blocks is variable.

Preferably, the synchronization data has a predetermined bit pattern including a plurality of bits, and the predetermined bit pattern is variable on the basis of the unit of the synchronization data.

Preferably, the synchronization data and information on the position of the running key (associated with the synchronization data) that has been used for encryption and decryption are stored in the storage means provided in the transmitting node and stored in the storage means provided in the receiving node. The synchronization data and the information on the position of the running key are data with which the synchronization has been confirmed. Also, in the transmitting node and the receiving node, the position of a running key that is used for encryption and decryption is determined based on the information on the position of the running key associated with the synchronization data that has been stored in the storage means when the re-synchronization of the running key has been performed.

Preferably, for the re-synchronization of the running key, the transmitting node or the receiving node starts to generate the running key at the position which is a fixed value ahead of the position of the running key associated with synchronization data with which the synchronization has been determined to be shifted.

In the encryption communication system using a multi-valued modulation scheme according to the further aspect of the present invention, a transmitting device modulates data to be transmitted into multi-valued data and transmits an encrypted multilevel optical signal, and a receiving device receives the multilevel optical signal and decrypts it using the same running key.

The transmitting device includes: a transmitting side pseudo random number generation unit for generating the running key based on an input of an encryption key K; a multi-valued optical signal generation unit for generating a multilevel optical signal based on the value of the running key for data to be transmitted; a synchronization data generation unit for generating synchronization data used to confirm the synchronization of the running key; an insertion unit for inserting the synchronization data that has been generated by the synchronization data generation unit into the data to be transmitted; and a transmitting side signal processing unit for monitoring whether the synchronization of the running key shared with the receiving device is established between the transmitting device and the receiving device.

The receiving device includes: optoelectric conversion means for receiving the transmitted optical signal to optoelectrically convert the optical signal; a receiving side pseudo random number generation unit for generating a running key that is the same as and synchronized with the running key generated in the transmitting side pseudo random number generation unit in accordance with an input of the encryption key K; a threshold control unit for controlling a receiving threshold value used to determine a multi-valued signal in accordance with the running key generated in the receiving side pseudo random number generation unit so as to convert the optical signal received by the optoelectric conversion unit into binary data and to output the binary data; and a receiving side signal processing unit for confirming a reception status of the synchronization data so as to monitor whether the synchronization of the running key is established between the receiving device and the transmitting device.

When the receiving side signal processing unit legitimately receives the synchronization data, it generates a synchronization confirmation signal and transmits it to the transmitting device. If the transmitting side signal processing unit does not receives the synchronization confirmation signal under a predetermined condition(s), it generates a status confirmation signal used to confirm the status of the receiving device and transmits it to the receiving device. When the transmitting side signal processing unit has confirmed that it does not legitimately receives a response to the status confirmation signal, it determines that the synchronization of the running key is shifted, and re-synchronization of the running key is performed. The encryption communication system using a multi-valued modulation scheme has the abovementioned configuration.

In a preferable embodiment of the encryption communication system using a multi-valued modulation scheme, if the receiving side signal processing unit cannot receive the synchronization data under a predetermined condition(s), it generates a status confirmation signal used to confirm the status of the transmitting device and transmits it to the transmitting device. If the receiving side signal processing unit does not legitimately receive a response to the status confirmation signal from the transmitting device, it generates a request (re-synchronization request) for re-synchronization of the running key and transmits it to the transmitting device. When the transmitting side signal processing unit receives the re-synchronization request, the re-synchronization of the running key is performed between the two devices.

Furthermore, the present invention may be understood as another configuration of the transmitting device and the receiving device which are used for the encryption communication system using a multi-valued modulation scheme.

Another embodiment of the method for the encryption communications using a multi-valued modulation scheme according to the present invention will be described below. In the method, a transmitting node modulates data to be transmitted into multi-valued data using the running key so as to encrypt the multi-valued data and transmits the encrypted data, and a receiving node receives the transmitted data and decrypts it using the same running key. The transmitting node produces synchronization data to be inserted in transmission data and then transmits the transmission data including the synchronization data. When the receiving node legitimately receives the synchronization data, it confirms the synchronization of the running key between the two nodes, and decrypts the received data using the same running key as the running key used for the encryption.

In a preferable embodiment of the method for the encryption communications using a multi-valued modulation scheme according to the present invention, the transmitting node encrypts the synchronization data using the running key and transmits it to the receiving node. The receiving node receives the synchronization data and decrypts it using the same running key as the running key that has been used to encrypt the synchronization data.

The present invention may be understood as a method for confirming the synchronization of the running key in encrypted communications using a multi-valued modulation scheme. In the method, the transmitting node modulates data to be transmitted into multi-valued data so as to encrypt the multi-valued data and transmits the encrypted data, and the receiving node receives the transmitted data and decrypts it using the same running key as the running key that has been used to encrypt the data. Specifically, the transmitting node modifies the transmission data to include synchronization data used to confirm the synchronization of the running key between the two nodes and transmits the transmission data including the synchronization data. When the receiving node legitimately receives the synchronization data, it determines that the synchronization of the running key is established. On the other hand, if the receiving node cannot properly detect the received data, it determines that the synchronization of the running key is not established.

In a preferable embodiment of the method for confirming the synchronization in encrypted communication using a multi-valued modulation scheme, if the receiving node cannot detect the synchronization data for a predetermined time, it detects that the synchronization of the running key is shifted.

In another preferable embodiment of the method for confirming the synchronization, the storage means provided in the transmitting node and the storage means provided in the receiving node each store the synchronization data that has been transmitted and received and information on the position of the running key that has been used for the encryption and decryption. When re-synchronization of the running key is required, a running key used for encryption and decryption is generated based on the information on the position of the running key associated with the synchronization data stored in the storage means.

According to the present invention, a shift of the synchronization of the running key between the transmitting node and the receiving node can be detected, and re-synchronization of the running key can be achieved in the state where the synchronization of the running key is shifted. Therefore, encrypted communications using a multi-valued modulation scheme can be achieved with high stability and high reliability.

BRIEF DESCRIPTION OF THE PREFERRED EMBODIMENT

DETAILED DESCRIPTION OF THE PREFERRED EMBODIMENTS

An embodiment of the present invention will be described below with reference to the accompanying drawings.

Figure 1:
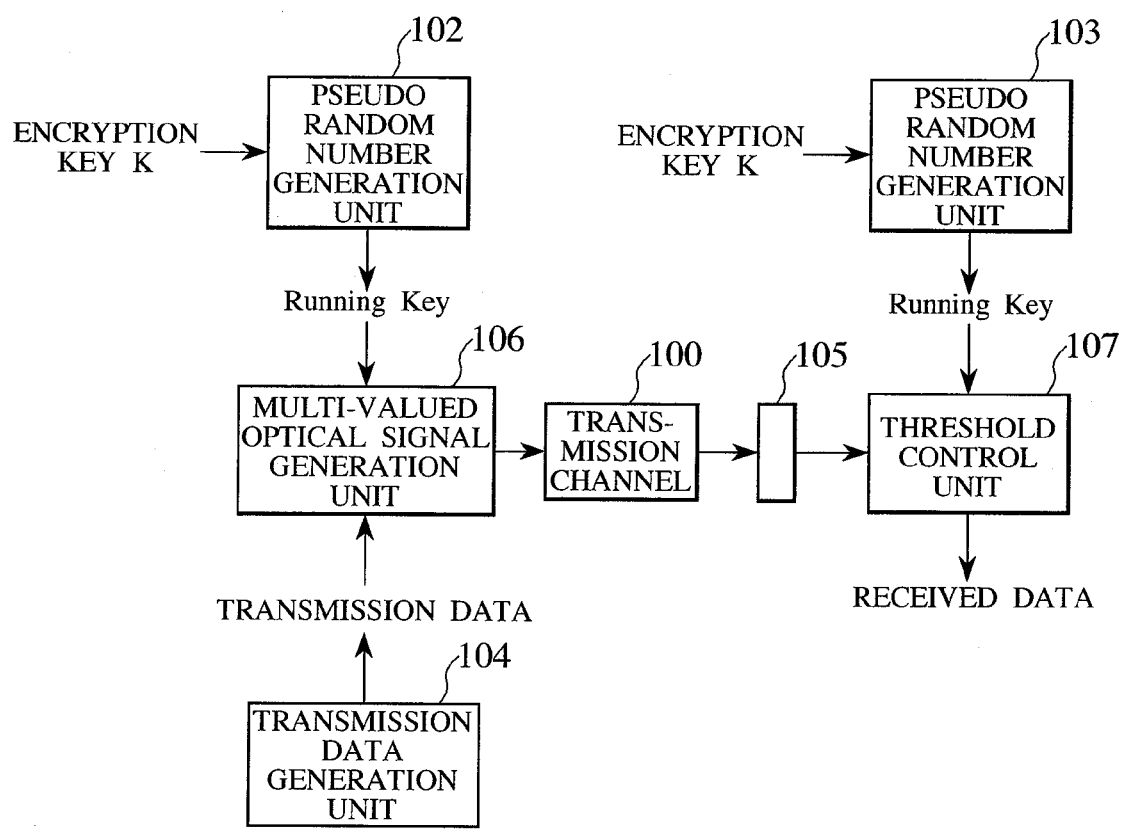
FIG. 1 is a diagram showing a basic configuration of an encryption communication system in which Yuen quantum cryptography is achieved with an optical intensity modulation scheme.

FIG. 1 is a diagram showing a basic configuration of an encryption communication system in which Yuen quantum cryptography is achieved with an optical intensity modulation scheme. In FIG. 1, a transmitting device is on the left side and a receiving device is on the right side, with a transmission channel 100 sandwiched between the two devices. The transmission channel 100 is, for example, an optical fiber.

The transmitting device includes: a transmitting side pseudo random number generation unit 102 for generating pseudo random numbers by inputting an encryption key K so as to generate a running key; a transmission data generation unit 104 for generating transmission data which is 0 or 1; and a multi-valued optical signal generation unit 106 for generating a multilevel analog signal (multilevel signal) based on the value of the running key for the transmission data.

The receiving device includes: a photodiode 105 for receiving the optical signal that has passed through the transmission channel 100 so as to optoelectrically convert the optical signal; a receiving side pseudo random number generation unit 103 for generating a running key that is the same as and synchronized with the running key generated in the transmitting side pseudo random number generation unit 102; and a threshold control unit 107. The threshold control unit 107 controls a receiving threshold value used to determine a multi-valued signal in accordance with the running key generated in the receiving side pseudo random number generation unit 103 so as to discriminate whether the optical signal received in the photodiode 105 is 0 or 1 and to output received data.

With such a configuration, in the transmitting device, transmission data generated in the transmission data generation unit 104 is generated as a multi-valued optical signal in accordance with a value set in the running key by the multi-valued optical signal generation unit 106. Then, the multi-valued optical signal is transmitted to the receiving device through the transmission channel 100. In the receiving device, the multi-valued optical signal that has been transmitted is optoelectrically converted by the photodiode 105. The threshold control unit 107 controls a receiving threshold value based on the same running key as that generated for transmission by the pseudo random number generation unit 103 so as to determine the converted signal as received data and outputs it. In the abovementioned Yuen quantum cryptography, the communication system includes a conventional optical communication scheme having low quantum efficiency. The Yuen quantum cryptography, however, is designed so that an eavesdropper cannot obtain information due to quantum fluctuations, providing hyperstability.

Figure 2:
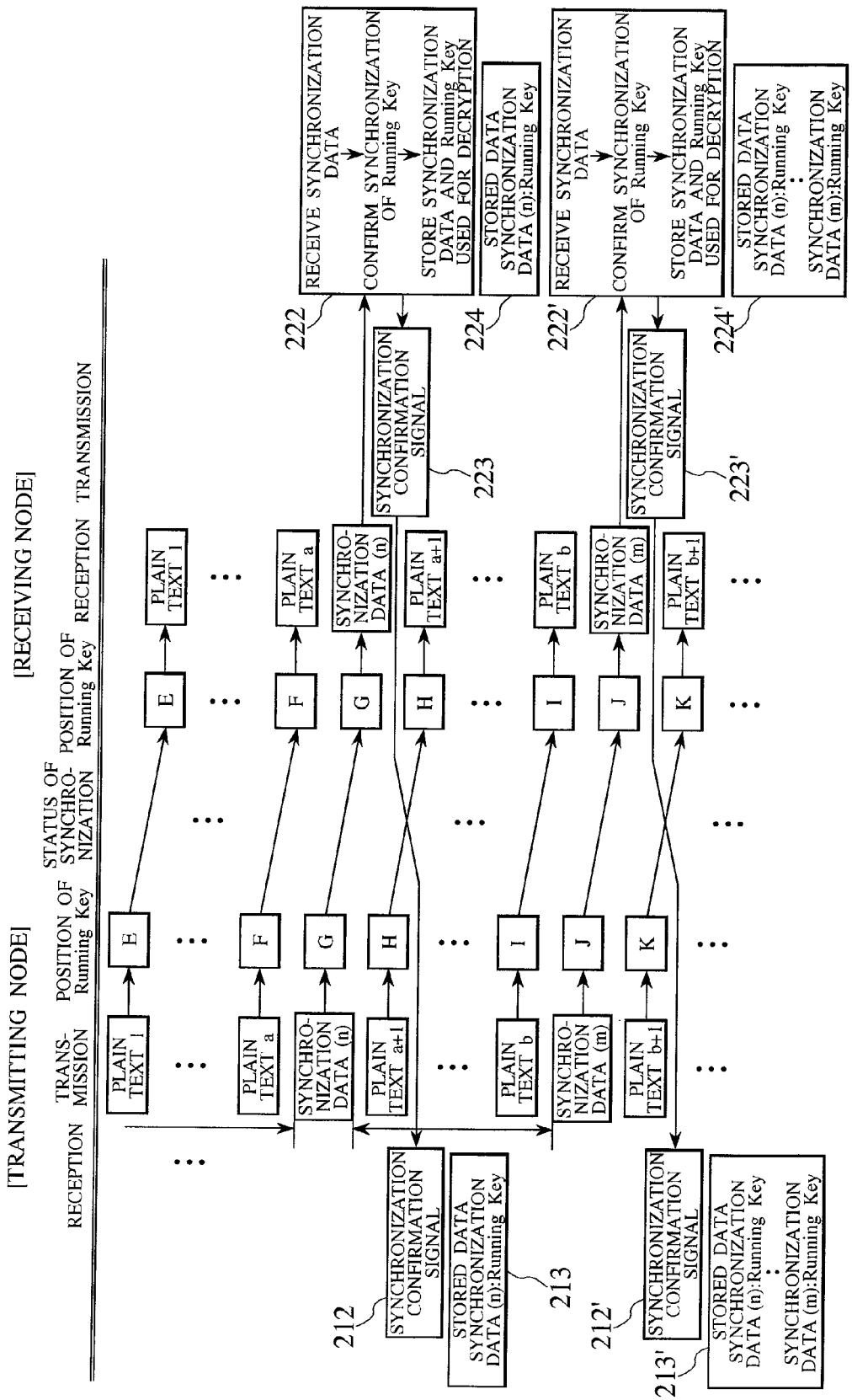
FIG. 2 is a diagram showing the principle of operations for confirming synchronization of a running key between a transmitting node and a receiving node, according to an embodiment of the present invention.

First, a description will be made of the principle of operations for confirming the synchronization of the running key (between the transmitting node and the receiving node) according to the embodiment of the present invention with reference to FIG. 2.

In the transmitting node, data (synchronization data) which requires information to confirm the synchronization of the running key is inserted into binary data (plain text) which is not encrypted in order to detect a shift of the synchronization of the running key. The information is, for example, data (synchronization data) indicating the order (nth number) of data inserted after the encryption is initiated (i.e., the order (nth number) of the synchronization data). The position to insert the synchronization data may be variably determined. It is preferable, however, that synchronization data be set to be inserted within a preset time (t) or a preset number of bits (r bits) based on the position of synchronization data that has been previously inserted. If the time t (or r bits) is too long (or too large), the significance of confirming the synchronization is reduced, and the re-synchronization of the running key requires a lot of time. The position to insert the synchronization data is preferably determined in consideration of the abovementioned effect. It should be noted that the plain text is data created in an upper layer such as a personal computer and a server.

The processing for inserting the synchronization data into the plain text is performed until the plain text no longer exists as long as there is no interrupt request. The synchronization data that has been inserted and the running key that has been used for encryption are associated with each other and stored in a memory provided in the transmitting node (213). The synchronization data and the information on the position of the running key are used for the subsequent processing for confirming the synchronization and processing for performing the re-synchronization. The synchronization data and the plain text in which the synchronization data is inserted are modulated and encrypted into multi-valued data by using the running key and transmitted to the receiving node.

The receiving node controls the receiving threshold value in accordance with the running key so as to decrypt data that has been encrypted by using the multi-valued modulation scheme. When the synchronization data can be extracted from the data that has been decrypted (or can be properly converted into binary data), the receiving node determines that the synchronization of the running key is established between the transmitting node and the receiving node (222). In addition, the synchronization data that has been extracted and information on the position of the running key that has been used for the decryption are associated with each other and stored in a memory provided in the receiving node (224). The synchronization data and the information on the position of the running key, which are stored in the memory, are used for the subsequent processing for the re-synchronization.

Thus, the synchronization data and the information on the position of the running key are maintained in the transmitting node and the receiving node. This is because the re-synchronization of the running key can be performed by using the synchronization data and the information on the position of the running key and because it is not necessary that the transmitting and receiving nodes inquire the other node of the synchronization data and the information on the position of the running key, which are required for initiating the re-synchronization.

After the receiving node has confirmed the synchronization, it transmits to the transmitting node a synchronization confirmation signal to confirm that the synchronization is established between the two nodes (223). For the synchronization confirmation signal, specified pattern data including a synchronization code is used so that the transmitting node can determine that the synchronization has been confirmed.

After receiving the synchronization confirmation signal (212), the transmitting node compares the synchronization code included in the synchronization confirmation signal with a synchronization code stored in the memory provided in the transmitting node. When the two codes coincide with each other, the transmitting node determines that the synchronization of the running key is established between the two nodes.

Figure 3:
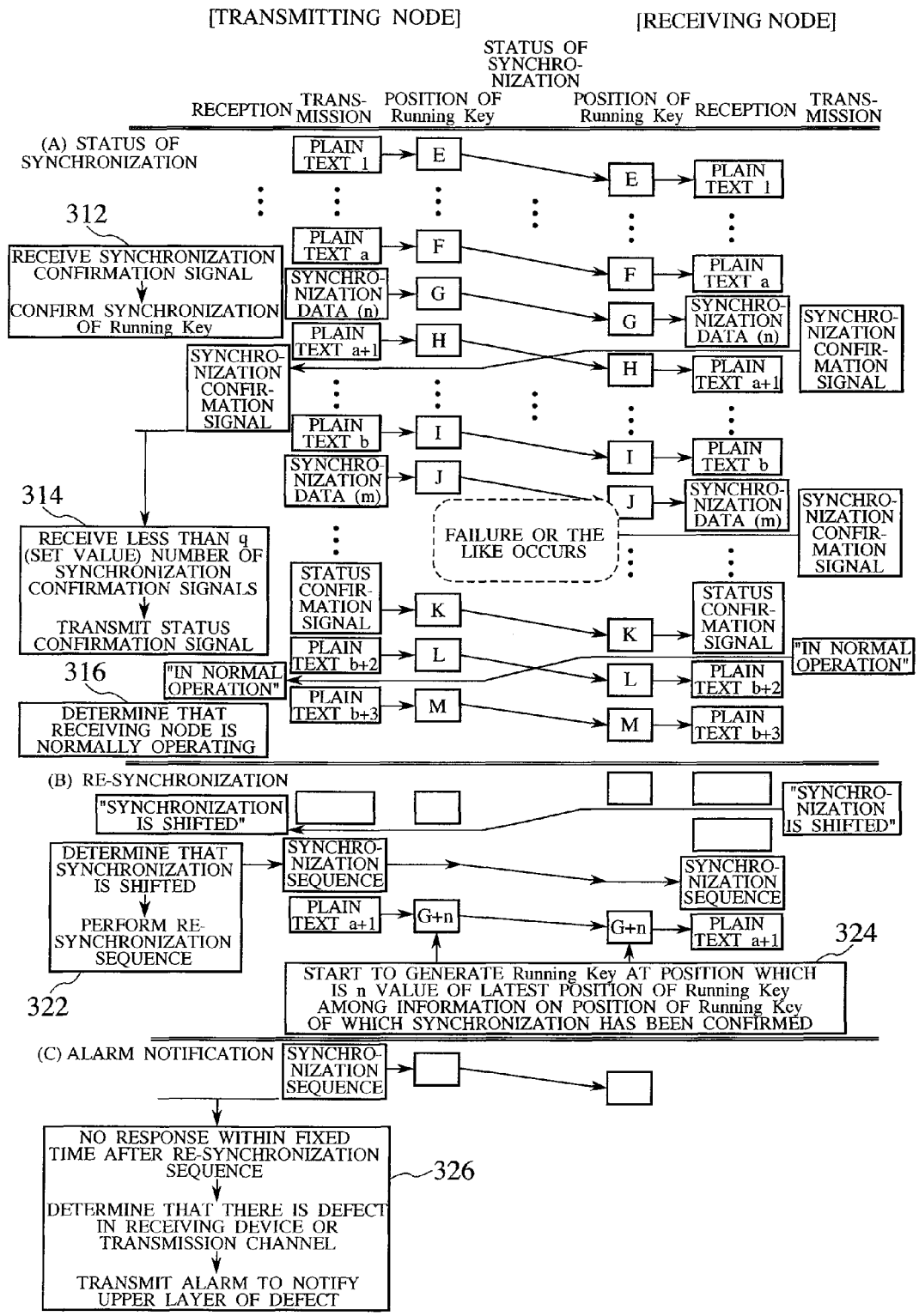
FIG. 3 is a flowchart showing operations for detection of a shift of the synchronization of the running key and operations for re-synchronization of the running key in a transmitting node according to the embodiment.

Next, a description will be made of operations for detection of a shift of the synchronization and operations for the re-synchronization in the transmitting node referring to FIG. 3.

After the transmitting node transmits the synchronization data, it monitors the status of reception of the synchronization confirmation signal that is transmitted from the receiving node and that corresponds to the synchronization data (312). In the transmitting node, a predetermined condition is set, for example, such that at least a q number of synchronization confirmation signals are received in response to p ($p \geq q$) numbers of transmitted signals including synchronization data within a predetermined time. If the number of the synchronization confirmation signals received is less than a set value (q), the transmitting node determines that a failure may occur in the receiving node and transmits a status confirmation signal to confirm the status of the receiving node (314). In this case, it is preferred that the set value (q) be set in consideration of a network configuration and processing time required to transmit the synchronization confirmation signal from the receiving node.

When the transmitting node receives from the receiving node a response (to the above status confirmation signal) indicating that the receiving node normally operates, it determines that the synchronization of the running key is established and continues the encrypted communications (316). It should be noted that the receiving node confirms whether processing for decrypting the synchronization data is normally performed before transmitting the response to the reception of the status confirmation signal. This operation will be described with reference to FIG. 4.

When the transmitting node receives a response (to the status confirmation signal) including a request, it analyzes the received data and performs processing that is requested by the receiving node. If the transmitting node does not receive a response to the status confirmation signal within a fixed time t after the transmission of the status confirmation signal, the transmitting node determines that the synchronization is shifted and performs a re-synchronization sequence (322).

The processing for the re-synchronization is to re-establish the synchronization of the running key between the transmitting and receiving nodes (324). To perform the re-synchronization, the transmitting node references synchronization data and information on the position of the running key to be used for the re-synchronization, which are stored in the memory provided in the transmitting node. Then, the transmitting node generates a running key at the position which is a fixed number (n) ahead of the position of the running key associated with synchronization data with which the synchronization has been confirmed. After that, the transmitting node uses the thus generated running key for encryption of plain text and synchronization data to generate multi-valued data and transmits the multi-valued data to the receiving node.

It should be noted that the purpose of generating a running key at the position which is a fixed number (n) ahead of the position of the running key associated with synchronization data is to prevent a duplication of the running key to be used and reduction in stability of the encryption.

If there is no response from the receiving node after the re-synchronization sequence is performed, the transmitting node determines that there is a defect in the receiving node or the transmission channel and transmits an alarm to notify the upper layer of the defect (326).

Figure 4:
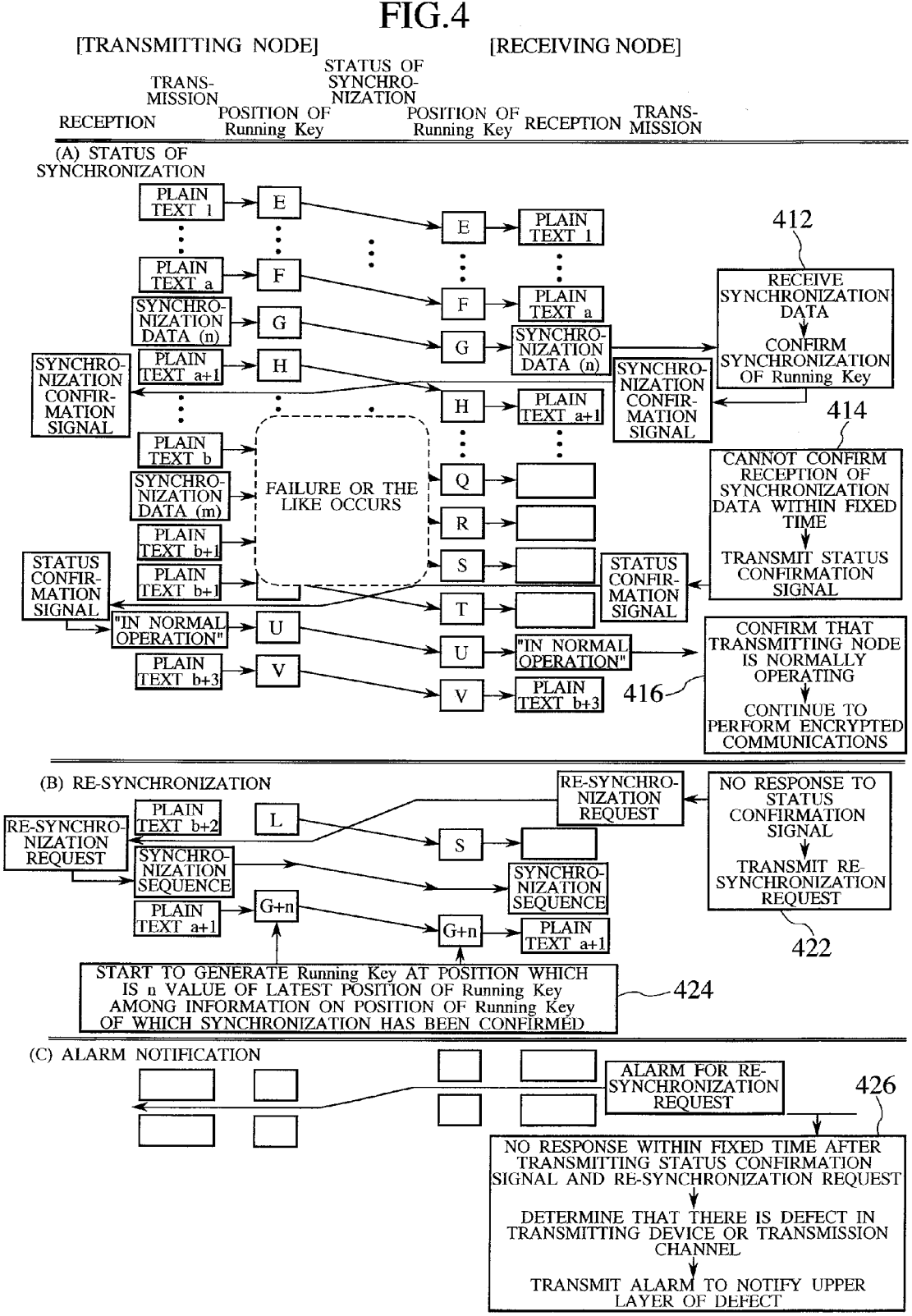
FIG. 4 is a flowchart showing operations for detection of a shift of the synchronization of the running key and operations for re-synchronization of the running key in a receiving node according to the embodiment.

Next, a description will be made of operations for detection of a shift of the synchronization and operations for processing for the re-synchronization in the receiving node with reference to FIG. 4.

The receiving node monitors an interval for detecting the synchronization data. Specifically, if the receiving node cannot detect the synchronization data within a fixed time (t) or a predetermined number of bits that is predetermined in the transmitting node, the receiving node transmits a status confirmation signal used to confirm the status of the transmitting node (414). When the receiving node receives from the transmitting node a response indicating that the transmitting node normally operates, the receiving node continues to perform the encrypted communications (416).

On the other hand, after the receiving node receives from the transmitting node a response (to the status confirmation signal) including a request, e.g., a request for the re-synchronization of the running key, the receiving node performs processing in response to the request. If the receiving node does not receive a response to the status confirmation signal from the transmitting node within a fixed time, it transmits a signal indicating a request for the re-synchronization (422). If the re-synchronization sequence is not performed within a fixed time in response to the signal indicating the request for the re-synchronization, the receiving node determines that there is a defect in the transmitting node or the transmission channel and transmits an alarm to notify the upper layer of the defect.

The re-synchronization sequence is performed with the abovementioned operations so as to perform the synchronization of the running key. The start position of generation of the running key, which is used when the re-synchronization is performed, is determined by using the synchronization data that has been stored when the processing for confirming the synchronization has been performed and that has been stored in the transmitting and receiving nodes. Specifically, the latest synchronization data is searched among synchronization data stored when the re-synchronization sequence is performed. A running key is generated at the position which is a fixed number (n) ahead of the position of the running key associated with the latest synchronization data. The thus generated running key is used to start to encrypt plain text and synchronization data into multi-valued data and decrypt (binary processing) the data that has been received. In this case, it is preferred that the fixed number (n) be a value which is optimal to prevent the running key from being duplicated due to a network configuration, a system configuration, and the like. With this scheme, a key used for encryption is always a key that has never been used. Thus, since the random property of an encryption key is not deteriorated, an amount of information provided to eavesdroppers is reduced and the safety of the encrypted communications is ensured.

Figure 5:
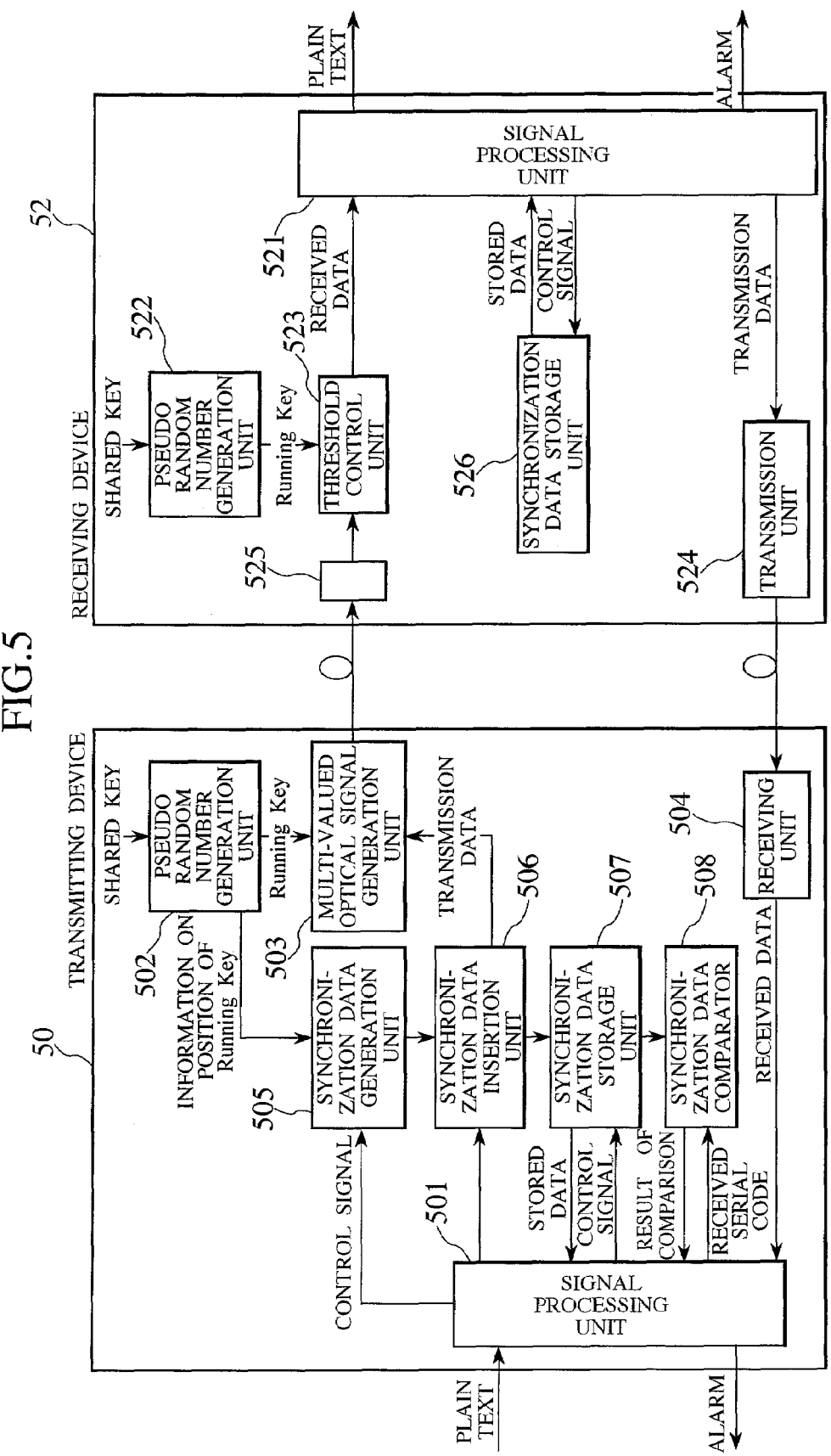
FIG. 5 is a block diagram showing an encryption communication system according to the embodiment.

FIG. 5 is a block diagram showing the configuration of an encryption communication system according to the embodiment.

Reference numeral 50 is a Y-00 quantum cryptography communication transmitting device; and 52, a Y-00 quantum cryptography communication receiving device.

The transmitting device 50 includes a signal processing unit 501, a pseudo random number generation unit 502, a multi-valued optical signal generation unit 503, a receiving unit 504, a synchronization data generation unit 505, a synchronization data insertion unit 506, a synchronization storage unit 507, a synchronization data comparator 508, and a memory (not shown). Each of the units is preferably configured by using a hardware circuit. As another example, processing functions of the signal processing unit 501, the synchronization data generation unit 505, the synchronization data insertion unit 506, the synchronization data comparator 508 and the like may be realized by use of a program executed by a microprocessor.

Next, the transmitting device 50 is described. A shared key is bit string data of about 100 bits and is stored in, e.g., the memory (not shown). The pseudo random number generation unit 502, which generates a running key from the shared key, is, for example, a random number generator. Also, the pseudo random number generation unit 502 sequentially generates random numbers using bit string data of the shared key as an initial value. The generated random numbers forms the running key used for encryption. The running key is provided to the multi-valued optical signal generation unit 503 and used to generate a multi-valued signal for transmission data. Information on the position of the running key is transmitted to the synchronization data generation unit 505 and used to identify a position in which synchronization data used to confirm the synchronization of the running key is inserted. The synchronization data generation unit 505 generates synchronization data used to confirm the synchronization of the running key. The synchronization data is of a specified bit pattern of n bits (n=2 or more). The synchronization data of n bits has a bit configuration of (p+v+p), where p is a fixed bit pattern, and v is a variable bit pattern. The bit pattern v can be changed each time synchronization data is generated. For example, a certain number may be added to and subtracted from the bit pattern v, or the bit pattern v may be variably controlled based on the random numbers which form the running key.

It should be noted that a control signal transmitted to the synchronization data generation unit 505 is a signal used to notify the synchronization data generation unit 505 of a position to insert synchronization data determined by the signal processing 501. To determine the bit pattern v included in the bit configuration of (p+v+p) based on the running key, a value of the bit pattern is determined by the abovementioned control signal and the information on the position of the running key, which is provided from the pseudo random number generation unit 502.

The signal processing unit 501 controls the pseudo random number generation unit 502, the synchronization generation unit 505, and the like. In addition, the signal processing unit 501 monitors the synchronization confirmation signal transmitted from the receiving device 52 to confirm whether the synchronization of the running key is established between the two devices, which are characteristic functions in the present embodiment. Specifically, the signal processing unit 501 calculates the number of signals including synchronization data which have been transmitted to the receiving device 52 and the number of the synchronization confirmation signals that have been received from the receiving device 52, and produces the results of the calculation to be stored in the memory provided in the transmitting device 50. Then, the signal processing unit 501 compares the number of the signals including synchronization data with the number of the synchronization confirmation signals so as to monitor whether the difference between them (the number of the received signals is smaller than that of the transmitted signal) is within a predetermined range. When the difference is within the predetermined range, the signal processing unit 501 determines that the synchronization of the running key is established. If the difference is out of the predetermined range, this means that there are a lot of signals including synchronization data with which the synchronization is not confirmed. In this case, the signal processing unit 501 determines that the synchronization is shifted due to a failure or the like.

The signal processing unit 501 creates transmission data from plain text that has been input and transmits it to the synchronization data insertion unit 506. The synchronization data insertion unit 506 inserts synchronization data generated by the synchronization data generation unit 505 into the plain text in accordance with the control signal transmitted from the signal processing unit 501. The position of the synchronization data to be inserted into the plain text may be determined on the basis of a k (k is 2 or more and a fixed number) number of plain text blocks or a t (variable) number of plain text blocks. For example, the variable number t may be determined based on information on the position of the running key generated by combining random numbers. The synchronization data inserted into the plain text is stored in a synchronization data storage unit (e.g., a memory) 510 and used to confirm the synchronization and to perform the re-synchronization of the running key.

When a synchronization confirmation signal transmitted from the receiving device 52 is received, the synchronization data comparator 508 compares information indicating synchronization data included in the synchronization confirmation signal with synchronization data that has been stored in the synchronization data storage unit 507 and that has been stored when a signal including the synchronization data has been transmitted. Based on the result of the comparison, the signal processing unit 501 determines whether the synchronization of the running key is established between the transmitting and receiving devices.

The multi-valued optical signal generation unit 503 converts transmission data into a multilevel signal in accordance with the running key so as to output the multilevel signal to a transmission channel. That is, plain text to be transmitted and synchronization data included in the plain text are converted into a multi-valued signal in accordance with the running key, and the multi-valued signal is output.

Next, the configuration of the receiving device 52 will be described.

The receiving device 52 includes a signal processing unit 521, a pseudo random number generation unit 522, a threshold control unit 523, a transmission unit 524, a photodiode (PD) 525, a synchronization data storage unit 526, and a memory (not shown). Each of the above units is preferably configured by using a hardware circuit. However, a processing function of the signal processing unit 521 may be realized by use of a program executed by a microprocessor.

Transmission data (to be received) is received by the photodiode 525. The received data is discriminated by the threshold control unit 523 which is controlled by the pseudo random number generation unit 522. Then, the thus discriminated data is converted into a binary signal. The signal processing unit 521 receives the discriminated binary signal and divides it into plain text and synchronization data so as to extract the synchronization data. The plain text is transmitted to an upper layer such as a personal computer.

Also, the signal processing unit 521 monitors whether a time interval of synchronization data included in received data can be detected to be within a predetermined time interval. The processing unit 521 is provided with a timer and performs the above detection by monitoring the timer to determine whether a time interval of synchronization data inserted in plain text is longer than a time interval set by the transmitting device. As a result of the timer monitoring, when the synchronization of the running key between the two devices is confirmed, the transmission unit 524 transmits to the transmitting device 50 a synchronization confirmation signal indicating synchronization data with which the synchronization has been confirmed.

If a problem such as a shift of the synchronization occurs, the transmission unit 524 transmits a status confirmation signal, a re-synchronization request signal, or the like depending on the problem. If the receiving device 52 does not receive a response from the transmitting device 50 within a predetermined time after transmitting the abovementioned signals, the receiving device 52 determines that there is a defect in the transmitting device 50 or the transmission channel and transmits an alarm to notify an upper layer such as a personal computer of the defect.

According to the present embodiment, two techniques are used to confirm the synchronization of the running key. One of the techniques is such that when synchronization data is converted into a binary signal, it is determined that the synchronization is established. The other is the abovementioned timer monitoring. For example, even if the synchronization of the running key is shifted and synchronization data cannot be detected, it may be determined that the above is caused only by the fact that the synchronization data is not inserted. To prevent the above, a transmitting node is set so that synchronization data is inserted within a preset time t after the previous synchronization data is inserted or within r bits of the position of the previous synchronization data. If the synchronization data cannot be detected within the preset time, the synchronization of the running key may be shifted. Thus, the timer monitoring function is effective.

A description will be made of the reasons for transmitting a synchronization confirmation signal each time synchronization data is received. The order of synchronization confirmation signals received by the transmitting node may be different from the order of signals (each corresponding to each of the synchronization confirmation signals) transmitted from the transmitting node depending on the status of communications in the network. If the transmitting node cannot detect a synchronization confirmation signal corresponding to transmitted synchronization data, it cannot share with the receiving node the position of the running key used for re-synchronization. To identify a synchronization confirmation signal corresponding to a signal including particular synchronization data among synchronization data transmitted from the transmitting node, a synchronization confirmation signal is transmitted each time synchronization data is received.

The signal processing unit 501 provided in the transmitting device 50 always monitors received data that has been transmitted from the receiving device 52. The received data includes a synchronization confirmation signal in some cases. The signal processing unit 501 analyzes the received data to monitor whether the synchronization confirmation signal is received. When the synchronization confirmation signal is received, the synchronization data comparator 508 compares information (indicating a synchronization confirmation signal corresponding to a signal including particular synchronization data transmitted from the transmitting node) indicating synchronization data included in a signal with synchronization data stored in the synchronization data storage unit 507. The result of the comparison is transmitted to the signal processing unit 501. In order to monitor the synchronization of the running key, the signal processing unit 501 calculates the difference between the number of signals including synchronization data that have been transmitted and the number of synchronization confirmation signals that have been received from the receiving device 52. The number of the signals including synchronization data and the number of the synchronization confirmation signals are the numbers of signals transmitted before the result of the comparison is transmitted. If the calculated difference (i.e., the number of the received synchronization confirmation signals is smaller than the other) is smaller than a predetermined value, there may be a failure. Thus, the signal processing unit 501 produces a status confirmation signal to be transmitted to the receiving device 52 to confirm the status of the receiving device 52. After that, the signal processing unit 501 receives a response to the status confirmation signal from the receiving device 52 so as to analyze the received response signal. When the signal processing unit 501 determines that the synchronization of the running key is shifted, it performs control to establish re-synchronization of the running key. On the other hand, if there is no response from the receiving device 52 within a predetermined time, the signal processing unit 501 determines that there is a defect in the receiving device 52 or the transmission channel and transmits an alarm to notify an upper layer such as a personal computer of the defect.

When the re-synchronization of the running key is performed, synchronization data stored in both of the synchronization data storage units 507 and 526 is referenced. The synchronization data storage units 507 and 526 are provided in the transmitting device 50 and the receiving device 52, respectively. After the reference, a running key is generated at the position which is a fixed number k ahead of the position of the running key corresponding to the most recently stored (the latest) synchronization data. Using the thus generated running key, transmission data is encrypted into multi-valued data and decrypted into binary data. Specifically, using the newly generated running key, the transmission data is converted into multi-valued data by the multi-valued optical signal generation unit 503. Using the same running key, the received data is decrypted (converted into binary data) by the threshold control unit 523 provided in the receiving device 52.

In the above case, control signals transmitted to the synchronization data storage unit 507 and 526 are used to call the position of the running key used for the re-synchronization. The synchronization data storage unit 507 and 526, which each have received the control signal, each read out the latest position of the running key among stored data.

The encryption communication system shown in FIG. 5 is an example of a one-way encryption communication system in which the transmitting device 50 transmits data to the receiving node 52. The encryption communication system according to the present invention, however, may be a bidirectional communication system with the abovementioned functions provided in both of the transmitting and receiving devices.

It should be noted that the signal processing unit 501 may have a function for executing mathematical encryption for plain text to be transmitted. In addition, the signal processing unit 521 may have a function for executing mathematical decryption for received plain text.

What is claimed is:

1. A method for transmitting a multilevel optical signal from a transmitting node to a receiving node, comprising the steps of:

generating in the transmitting node a running key based on an input of an encryption key K;

generating in the transmitting node synchronization data used to confirm synchronization of the running key between the transmitting node and the receiving node;

inserting in the transmitting node the synchronization data into transmission data;

generating in the transmitting node the multilevel optical signal based on the value of the running key for synchronization data and the transmission data;

transmitting the multilevel optical signal to the receiving node;

storing in a first storage unit of the transmitting node each of the synchronization data that has been inserted into the transmission data and the running key in association with each other;

monitoring in the transmitting node whether the synchronization of the running key used is established between the transmitting node and the receiving node;

receiving in the receiving node the multilevel optical signal and converting the multilevel optical signal into an electric signal;

generating in the receiving node a running key that is the same as and synchronized with the running key generated in the transmitting node in accordance with the input of the encryption key K;

controlling in the receiving node a receiving threshold value used to determine the multilevel optical signal in accordance with the running key generated in the receiving node so as to convert the multilevel optical signal received into binary data and to output the binary data;

storing in a second storage unit of the receiving node each of the synchronization data divided from the transmission data and the running key generated in the receiving node in association with each other;

confirming in the receiving node a status of reception of the synchronization data so as to monitor whether the synchronization of the running key is established between the receiving node and the transmitting node;

generating a synchronization confirmation signal in the receiving node and transmitting the synchronization confirmation signal to the transmitting node when the receiving node legitimately receives the synchronization data;

generating in the transmitting node a status confirmation signal used to confirm the status of the receiving node and transmitting the status confirmation signal to the receiving node when the transmitting node does not legitimately receive the synchronization data under a predetermined condition; and determining according to a response to the status confirmation signal whether the synchronization of the running key is shifted and perform re-synchronization of the running key between the transmitting node and the receiving node, wherein the transmitting and receiving nodes each determine the position of the running key for the encryption and decryption based on the information on the position of the running key associated with the synchronization data stored in the first and the second storage unit when the re-synchronization of the running key is performed, and wherein the transmitting and receiving node each generate a new running key at a position that is ahead of the position of the running key associated with the synchronization data with which the synchronization has been confirmed while referencing the synchronization data and information on a position of the corresponding running key stored in the first and second storage unit.

2. The method according to claim 1,
wherein when the receiving node cannot receive the synchronization data under a predetermined condition, the receiving node transmits to the transmitting node a status confirmation signal used to confirm the status of the transmitting node, wherein when the receiving node does not legitimately receive a response to the status confirmation signal from the transmitting node, the receiving node transmits to the transmitting node a request (re-synchronization request) for re-synchronization of the running key between the transmitting and receiving nodes, and wherein after the transmitting node receives the re-synchronization request, the re-synchronization of the running key is performed between the transmitting and receiving nodes.

3. The method according to claim 1,
wherein when the transmitting node receives only a q number of the synchronization confirmation signals in response to a p (p≧q) number of signals including the synchronization data within a predetermined time, the transmitting node transmits the status confirmation signal to the receiving node.

4. The method according to claim 1, wherein when the receiving node cannot detect the synchronization data transmitted from the transmitting node within a predetermined time or within a predetermined number of bits, the receiving node transmits the status confirmation signal to the transmitting node.

5. The method according to claim 1, wherein the transmitting node encrypts data including plain text data and the synchronization data into multi-valued data using the running key and transmits the multi-valued data.

6. The method according to claim 5,
wherein one unit of the synchronization data is inserted into one or more plain text blocks, and
wherein the position of the synchronization data that is inserted in the plain text block is variable.

7. The method according to claim 1, wherein the synchronization data has a predetermined bit pattern including a plurality of bits, and the predetermined bit pattern is variable on the basis of a unit of the synchronization data.

8. The method according to claim 1,
wherein for the re-synchronization, the transmitting and receiving nodes start to generate a running key at the position which is a fixed value ahead of the position of the running key associated with synchronization data with which the synchronization has been determined to be shifted.

9. An encryption communication system using multi-valued modulation, comprising:
a transmitting device; and
a receiving device,
wherein the transmitting device modulates data to be transmitted into multi-valued data using a running key and transmits an encrypted multilevel optical signal, and
wherein a receiving device receives the transmitted multilevel optical signal and decrypts the data using the running key,
wherein the transmitting device comprises:
a transmitting side pseudo random number generation unit for generating the running key based on an input of an encryption key K;
a multi-valued optical signal generation unit for generating a multilevel optical signal based on the value of the running key for data to be transmitted;
a synchronization data generation unit for generating synchronization data used to confirm synchronization of the running key between the transmitting device and the receiving device;
an insertion unit for inserting the synchronization data that has been generated by the synchronization data generation unit into the data to be transmitted;
a first storage unit for storing each of the synchronization data that has been inserted into the data and the running key generated by the transmitting side pseudo random number generation unit in association with each other; and a transmitting side signal processing unit for monitoring whether the synchronization of the running key used is established between the transmitting device and the receiving device, and wherein the receiving device comprises:

an optoelectric conversion unit for converting the optical signal received into an electrical signal;

a receiving side pseudo random number generation unit for generating a running key that is the same as and synchronized with the running key generated in the transmitting side pseudo random number generation unit in accordance with the input of the encryption key K;

a threshold control unit for controlling a receiving threshold value used to determine a multi-valued signal in accordance with the running key generated by the receiving side pseudo random number generation unit so as to convert the multi-valued optical signal received by the optoelectric conversion unit into binary data and to output the binary data;

a second storage unit for storing each of the synchronization data that has been inserted into the data and the running key generated by the receiving side pseudo random number generation unit in association with each other; and a receiving side signal processing unit for confirming a status of reception of the synchronization data so as to monitor whether the synchronization of the running key is established between the receiving device and the transmitting device, wherein when the receiving side signal processing unit legitimately receives the synchronization data, the receiving side signal processing unit generates a synchronization confirmation signal and transmits the synchronization confirmation signal to the transmitting device, wherein when the transmitting side signal processing unit does not legitimately receive the synchronization data under a predetermined condition, the transmitting side signal processing unit generates a status confirmation signal used to confirm the status of the receiving device and transmits the status confirmation signal to the receiving device, and wherein when the transmitting side signal processing unit confirms that a response to the status confirmation signal is not legitimately received, the transmitting side signal processing unit determines that the synchronization of the running key is shifted, and re-synchronization of the running key between the transmitting device and the receiving device is performed, wherein the transmitting side signal processing unit controls the transmitting side pseudo random number generation unit to generate a new running key at a position that is ahead of the position of the running key associated with the synchronization data with which the synchronization has been confirmed while referencing the synchronization data and information on a position of the corresponding running key stored in the first storage unit, and wherein the receiving side signal processing unit controls the receiving side pseudo random number generation unit to generate a new running key as the same in the transmitting side at a position that is ahead of the position of the running key associated with the synchronization data with which the synchronization has been confirmed while referencing the synchronization data and information on a position of the corresponding running key stored in the second storage unit.

10. The encryption communication system using multi-valued modulation according to claim 9, wherein when the receiving side signal processing unit cannot receive the synchronization data under a predetermined condition, the receiving side signal processing unit generates a status confirmation signal used to confirm the status of the transmitting device and transmits the status confirmation signal to the transmitting device, wherein when the receiving side signal processing unit does not legitimately receive a response to the status confirmation signal from the transmitting device, the receiving side signal processing unit generates a request (re-synchronization request) for the re-synchronization of the running key and transmits the re-synchronization request to the transmitting device, and wherein when the transmitting side signal processing unit receives the re-synchronization request, the re-synchronization of the running key is performed.

11. A method for transmitting a multilevel optical signal from a transmitting device to a receiving device, comprising the steps of:

generating in the transmitting device a running key based on an input of an encryption key K;

generating in the transmitting device synchronization data used to confirm synchronization of the running key between the transmitting device and the receiving device;

inserting in the transmitting device the synchronization data into plain test data;

generating in the transmitting device the multilevel optical signal based on the value of the running key for synchronization data and the plain text data;

transmitting the multilevel optical signal to the receiving device;

storing in a first storage unit of the transmitting device each of the synchronization data that has been inserted into the plain text data and the running key in association with each other;

monitoring in the transmitting device whether the synchronization of the running key used is established between the transmitting device and the receiving device;

receiving in the receiving device the multilevel optical signal and converting the multilevel optical signal into an electric signal;

generating in the receiving device a running key that is the same as and synchronized with the running key generated in the transmitting device in accordance with the input of the encryption key K;

controlling in the receiving device a receiving threshold value used to determine the multilevel optical signal in accordance with the running key generated in the receiving device so as to convert the multilevel optical signal received into binary data and to output the binary data;

dividing the binary data into the plain test data and the synchronization data;

storing in a second storage unit of the receiving device each of the synchronization data divided from the plain text data and the running key generated in the receiving device in association with each other;

confirming in the receiving device a status of reception of the synchronization data so as to monitor whether the synchronization of the running key is established between the receiving device and the transmitting device;

generating a synchronization confirmation signal in the receiving device and transmitting the synchronization confirmation signal to the transmitting device when the receiving device legitimately receives the synchronization data;

generating in the transmitting device a status confirmation signal used to confirm the status of the receiving device and transmitting the status confirmation signal to the receiving device when the transmitting device does not legitimately receive the synchronization data under a predetermined condition;

determining according to a response to the status confirmation signal whether the synchronization of the running key is shifted and perform re-synchronization of the running key between the transmitting device and the receiving device;

generating in the transmitting device a new running key at a position that is a predetermined the position of the running key associated with the synchronization data with which the synchronization has been confirmed while referencing the synchronization data and information on a position of the corresponding running key stored in the first storage unit; and generating in the receiving device a new running key as the same in the transmitting device at a position that is ahead of the position of the running key associated with the synchronization data with which the synchronization has been confirmed while referencing the synchronization data and information on a position of the corresponding running key stored in the second storage unit.

12. The method according to claim 11,
wherein when the receiving device cannot receive the synchronization data under a predetermined condition, the receiving device generates the status confirmation signal used to confirm the status of the transmitting device and transmits the status confirmation signal to the transmitting device, wherein when the receiving device does not legitimately receive a response to the status confirmation signal from the transmitting device, the receiving device generates a request for the re-synchronization of the running key and transmits the re-synchronization request to the transmitting device, and wherein when the transmitting device receives the re-synchronization request and determines that the re-synchronization of the running key is performed.

13. The method according to claim 11,
wherein one unit of the synchronization data is inserted into one or more plain text data blocks, and
wherein the position of the synchronization data that is inserted in the plain text data block is variable.

14. The method according to claim 11, wherein the synchronization data has a predetermined bit pattern including a plurality of bits, and the predetermined bit pattern is variable on the basis of a unit of the synchronization data.

15. The method according to claim 11, wherein the transmitting and receiving nodes start to generate a running key at the position which is a fixed number ahead of the position of the running key associated with synchronization data with which the synchronization has been determined to be shifted.

16. The encryption communication system using multi-valued modulation according to claim 9,
wherein the transmitting side signal processing unit calculates the number of signals including synchronization data which have been transmitted to the receiving device and the number of the synchronization confirmation signals that have been received from the receiving device, and produces the results of the calculation to be stored in a memory provided in the transmitting device, and wherein the transmitting side signal processing unit compares the number of the signals including synchronization data with the number of the synchronization confirmation signals so as to monitor whether the difference between them is within a predetermined range and when the difference is out of the predetermined range the transmitting side signal processing unit determines that the synchronization is shifted due to a failure or the like.

* * * * *